Feb. 10, 1942.   E. ST. JOHN   2,272,253
CABLE LASHING MACHINE
Filed Oct. 29, 1940    4 Sheets-Sheet 1
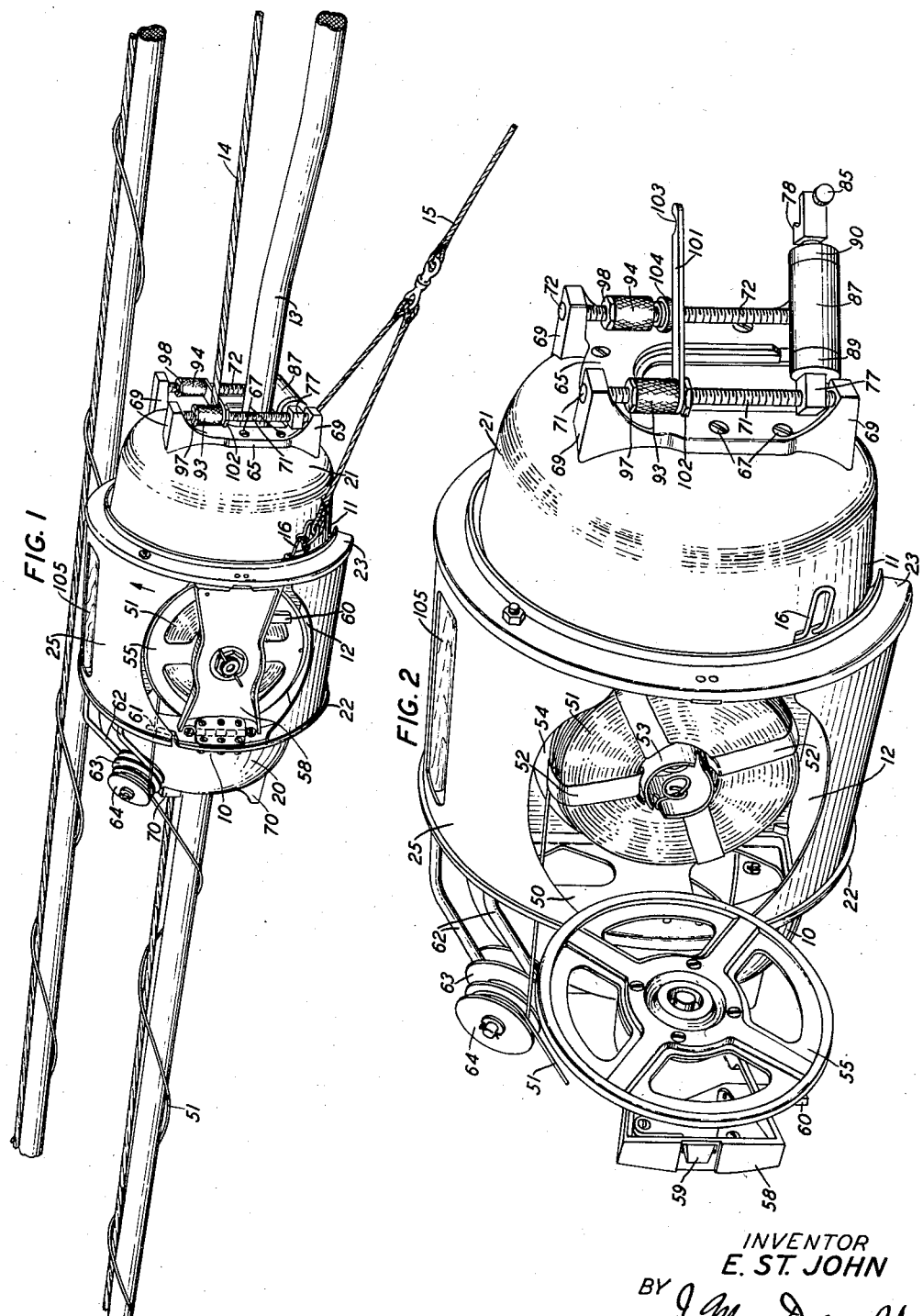
INVENTOR
E. ST. JOHN
BY J. MacDonald
ATTORNEY Feb. 10, 1942.   E. ST. JOHN   2,272,253
CABLE LASHING MACHINE
Filed Oct. 29, 1940   4 Sheets-Sheet 2

INVENTOR
E. ST. JOHN
BY
J. MacDonald
ATTORNEY

Feb. 10, 1942.   E. ST. JOHN   2,272,253
CABLE LASHING MACHINE
Filed Oct. 29, 1940   4 Sheets-Sheet 3

INVENTOR
E. ST. JOHN
BY J. MacDonald
ATTORNEY

Feb. 10, 1942.   E. ST. JOHN   2,272,253
CABLE LASHING MACHINE
Filed Oct. 29, 1940   4 Sheets-Sheet 4
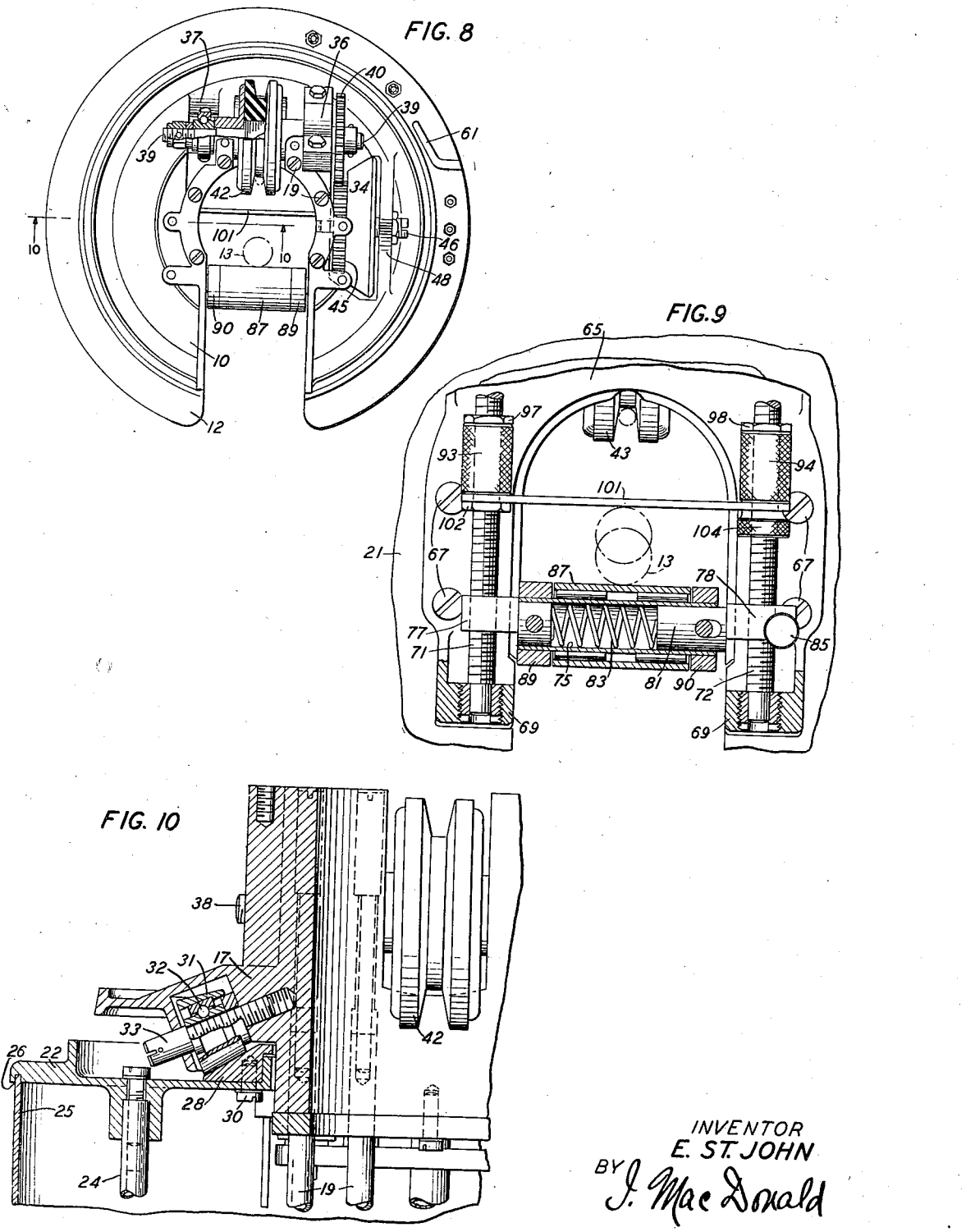
INVENTOR
E. ST. JOHN
BY J. MacDonald
ATTORNEY Patented Feb. 10, 1942

2,272,253

UNITED STATES PATENT OFFICE 2,272,253

CABLE LASHING MACHINE

Everett St. John, Westport, Conn., assignor to Bell Telephone Laboratories, Incorporated, New York, N. Y., a corporation of New York Application October 29, 1940, Serial No. 363,289

5 Claims. (Cl. 175—376)

This invention relates to the installation of aerial cable and more particularly to a machine for securing an aerial cable to a supporting or messenger strand.

It is the object of the present invention to provide a device for securing an aerial cable to a supporting strand in such a manner that there will be a minimum amount of movement between the cable and the strand.

Another object of this invention is the provision, in a single unitary structure, of means for holding the supporting strand and cable in close relation and serving a wire therearound to bind the cable and supporting strand securely together.

A further object of the invention is the provision of a device for securing together an aerial cable and supporting strand which may be readily positioned and removed from the strand and cable.

The machine of this invention is an improvement over the machine which forms the subject of applicant's pending application, Serial No. 274,473, filed May 19, 1939.

In the well known method of supporting aerial cable from a messenger or supporting strand in which the cable is supported by means of cable rings, the rings are rigidly secured to the strand and the cable lies loosely therein, thereby spacing the cable some distance from the strand.

While the above method of supporting aerial cable has had a wide usage it has, nevertheless, some disadvantages. For example, the cable is subjected to considerable damage due to creeping and buckling which movement causes crystallization of the sheath, ring cuts, and other damage. Furthermore, due to the cable lying loosely in the rings, chafing results which causes damage to the sheath of the cable. Damages to aerial cable are expensive to repair and result in a loss of revenue due to the cable being out of service.

In the preferred form of my invention I provide a chassis having spaced apart stationary front and rear housings and a rotatable cylinder or drum positioned between these housings and revolving thereon, said stationary housings containing the mechanism for driving the rotatable drum which carries, in a compartment located therein, a preformed coil of lashing wire which as the machine advances along the strand is paid out and wrapped around the strand and cable, thereby securing them together in such a way that there is little or no movement therebetween.

The features of my invention will be more readily understood from the following detailed description made with reference to the accompanying drawings in which:

Fig. 1 is a view in perspective of my invention on a fragment of strand and cable in the process of lashing the wire therearound, and an adjacent cable previously lashed to a supporting strand by said machine;

Fig. 2 is an enlarged perspective view of the machine shown in Fig. 1 with the gate to the wire compartment open and the cable lifter and the strand latch swung open to permit the entrance of the cable and strand;

Fig. 8 is a sectional view taken on line 8—8 of Fig. 3;

Fig. 9 is a fragmentary view partly in section taken on line 9—9 of Fig. 3 of the front end of the machine disclosing the structure of the cable lifter assembly;

Fig. 10 is a fragmentary view partly in section taken on line 10—10 of Fig. 8.

Figure 3:
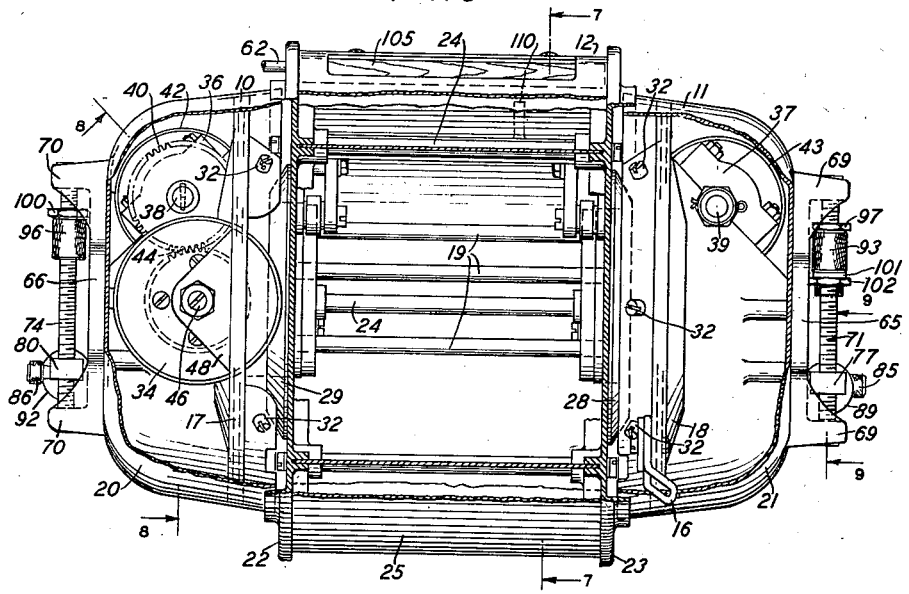
Fig. 3 is a side elevational view of Fig. 2 with portions broken away, on line 3—3 of Fig. 7, to show the operating mechanism for driving the rotatable drum.

As shown in the drawings heretofore referred to, the cable lashing machine of this invention comprises two stationary casings or housings 10 and 11, spaced apart and having journaled therebetween a rotatable cylinder or drum 12. The housings 10 and 11 contain the mechanism for causing the drum 12 to rotate as the machine advances along the cable 13 and strand 14 when the machine is towed along by means of the hand-line 15 which is secured to the front end of the housing 11 by means of the attachments 16.

Figure 4:
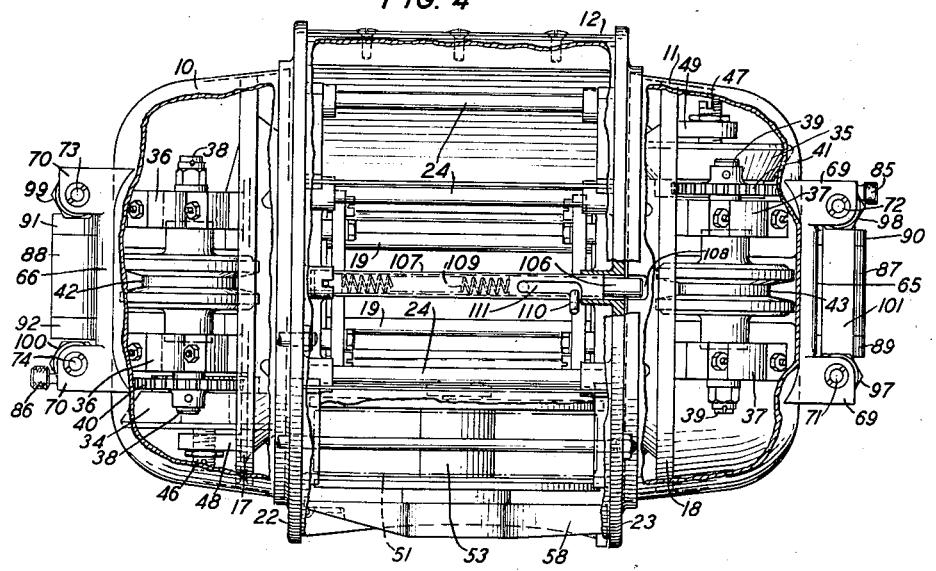
Fig. 4 is a top plan view of Fig. 3 with portions broken away to show the driving mechanism.
Figure 5:
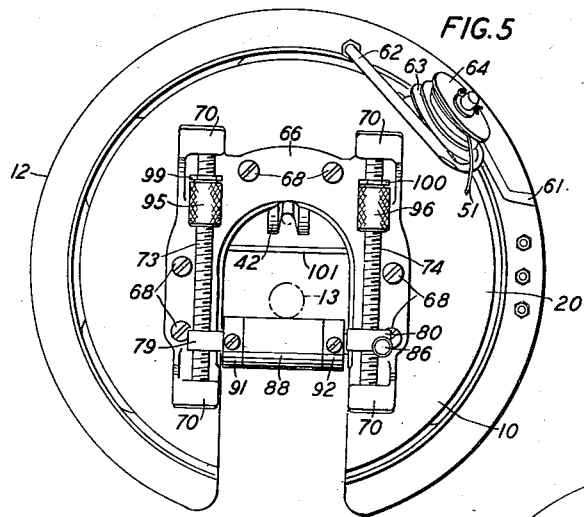
Fig. 5 is a rear end view of Fig. 3 with the rotating drum in its normal or locked position.
Figure 6:
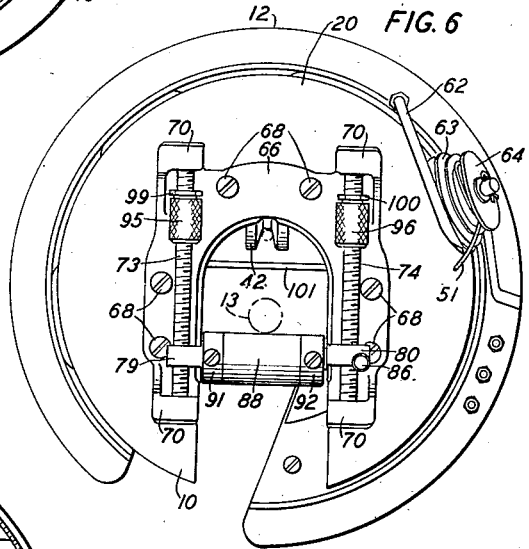
Fig. 6 is a view similar to Fig. 5 except that the rotatable drum has been unlocked and has been rotated slightly clockwise.

As shown in Figs. 3 and 4, the two end housings or casings 10 and 11, which contain the mechanism for driving the drum 12, comprise two castings 17 and 18 spaced apart and held in spaced relation by means of the tie rods 19 which are secured to the inner portions of the castings and serve to join the two castings together to form a single unitary structure. The castings 17 and 18 are provided with covers 20 and 21 which serve to exclude dirt and moisture from the mechanism enclosed therein.

The rotatable drum 12, which is positioned between the end housings 10 and 11, comprises two end castings 22 and 23 spaced apart and secured together by means of suitable spacer rods 24. A sheet metal cover 25, which fits into the grooves 26 and 27 of the castings 22 and 23, provides a closure for said drum. As shown in Figs. 3 and 4, and more in detail in Fig. 10, there is secured to the outer faces of the castings 22 and 23 the beveled ring segments 28 and 29. These rings are secured to the castings by means of stud screws 30 which pass through the castings into the ring segments from the inside of the drum.

Mounted on the stationary castings 17 and 18 adjacent their peripheries are the tapered rollers 31. These rollers are journaled in the castings and support the drum 12 by bearing against the beveled ring segments 28 and 29. The tapered rollers 31 are rotatably mounted on ball bearings 32 which in turn are secured in the castings 17 and 18 by means of the stud bolts 33. The tapered rollers 31 together with the beveled ring segments 28 and 29 provide frictionless bearing surfaces for the drum thereby permitting the drum to revolve freely and to also maintain it in position and guard against displacement.

In order that the machine may be readily positioned on and removed from the cable and supporting strand, the bottom portions of both the rotating drum 12 and the housings 10 and 11 have been cut away as shown in Figs. 5, 6, 7 and 8. The beveled ring segments 28 and 29 also have had a portion cut from them so that they conform with the shape of the castings 17 and 18 which form part of the housings 10 and 11. Located in each of the housings 10 and 11 and journaled in the castings 17 and 18, as shown in Figs. 3 and 4, are the mechanisms for driving the drum 12. As shown in the figures above referred to, the structure for driving the drum is the same mechanically, in each housing, the only difference between the one located in the front end and the one located in the rear end of the machine being that the friction wheels 34 and 35, which bear against the beveled ring segments 28 and 29, are located on opposite sides of the machine, that is, they are located 180 degrees apart. The purpose of this structure, as will be more clearly understood from the following detailed description, is to provide continuous power to drum 12 during its travel along the strand 14. This is accomplished by maintaining frictional contact with the drum during the rotation thereof which would be interrupted when the cut-out portions of the beveled ring segments were adjacent the friction wheels 34 or 35.

Journaled in the bearings 36—36 and 37—37 of the castings 17 and 18 are the axles 38 and 39 to which are secured at one end thereof the pinions or driving gears 40 and 41. Centrally located on the axles 38 and 39, between the bearings 36—36 and 37—37 are the grooved pulleys 42 and 43 which frictionally engage the messenger or supporting strand when the machine is in its operation position. The pulleys 42 and 43 comprise two metallic plates between which are secured a grooved member constructed from tough rubber or some other similar material which will firmly grip the strand 14 and yet not wear unduly.

As shown in Figs. 3, 4 and 8, the driving gears or pinions 40 and 41 and the pinion gears 44 and 45 which are secured to the shaft or axles 46 and 47 which in turn are journaled in bearings 48 and 49 have secured thereto the friction wheels 34 and 35, the peripheries of which are in frictional engagement with the beveled ring segments 28 and 29, which in turn are rigidly secured to the rotatable drum 12. Thus when movement is imparted to the grooved pulleys 42 and 43 by moving the machine along the strand 14, the gears 40 and 41 mounted on the same shaft with these pulleys are caused to rotate and due to these gears being in constant mesh with the driven gears 44 and 45 which are secured on the same shaft 46 and 47 as the friction wheels 34 and 35, the rotation will be imparted to the friction wheels and due to the friction exerted between the friction wheels 34 and 35 and the beveled ring segments 28 and 29, the drum will be caused to rotate and due to the fact that one of the friction wheels 34 or 35 will always be in constant engagement with one of the beveled ring segments, continuous movement will be imparted to said drum with no interruption in its operation.

Figure 7:
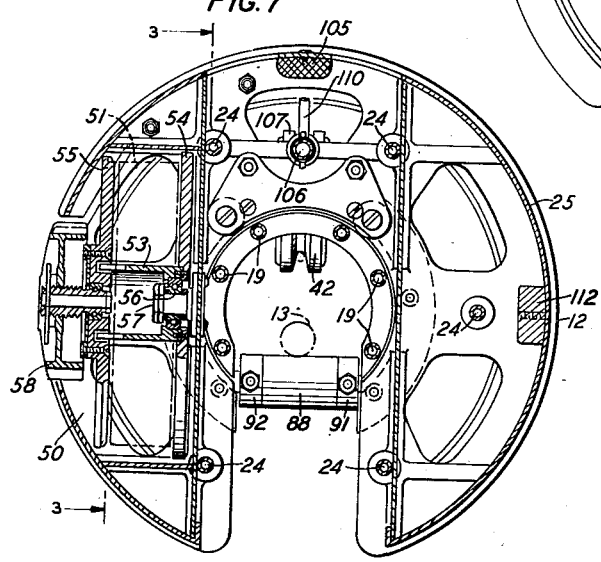
Fig. 7 is a sectional view taken on line 7—7 of Fig. 3.
Figure 11:
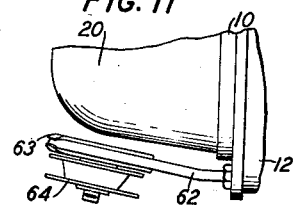
Fig. 11 is a fragmentary view illustrating in detail the mechanism for tensioning the lashing wire as it leaves the machine.

As shown in Figs. 1, 2 and 7, there is located in the rotatable drum 12 a magazine or compartment 50 for the storage of the preformed coil of wire 51 which as shown in Fig. 2 is held in its preformed condition by means of the fabric tapes 52, thus providing a temporary means for preventing the wire from unwinding and facilitating the placing of the wire in position to be wrapped around the cable and strand. Due to the fact that the tapes 52 are fabric, they will be severed during the first revolution of the wire coil or they may be cut manually before the gate 58 is closed.

In order that the lashing wire 51 may be paid out without snarling and with the least amount of friction, a rotating spool comprising a spindle 53 and two flanges 54 and 55 are provided. As shown in detail in Figs. 2 and 7, the flange 54 is secured to the spindle 53 which in turn is rotatably mounted on a ball bearing support which is secured to an inner partition located inside of the drum by means of nuts 57. In order to facilitate the placing of the lashing wire 51 on the spindle 53, the flange 55 is rotatably mounted on the hinged gate 58 as shown in Fig. 2 which when in its closed position as shown in Fig. 1 overlaps the spindle 53 and bears against the coil of wire 51. Means comprising a latch 59 and a releasing lever 60 is provided on the hinged gate 58 for locking the gate in its closed position to prevent displacement of the wire 51.

As shown in Figs. 1 and 2, the end of the wire 51 is brought out through a slot 61 in the rear portion of the drum 12 and in order to guide the wire 51 and to provide suitable tension thereto, a U-shaped bracket 62 having its free ends secured to the end of the drum 12 adjacent the slot 61 which has rigidly secured thereto a base member 63 on which there is rotatably mounted a grooved pulley 64 around which the wire 51 is snubbed and passes as it leaves the coil and is wrapped around the strand 14 and cable 13 as shown in Fig. 1.

In order that the wire 51 when tensioned by the device 63—64 may tightly bind the cable 13 and the strand 14 together, it is desirable that the cable 13 be brought up and spaced slightly away from the strand 14 just prior to the application of the lashing wire 51, thereby permitting the wire to pull the cable up close to the strand. To accomplish this, there is mounted at the front and rear ends of the machine, adjustable cable lifting means which will accommodate various sizes of cable.

As referred to above, in order to maintain the cable 13 and the strand 14 in definite spaced relation while being lashed, there has been provided at each end of the machine, secured to the end castings 10 and 11, adjustable means for lifting the cable 13. The cable lifting means are shown in Figs. 1, 2, 3, 4, 5, 6, 8 and more in detail in Fig. 9 and comprise a pair of U-shaped castings 65 and 66 which are secured to the end castings 10 and 11 by means of screws 67 and 68. Extending outwardly from each of the castings and at right angles thereto are ears or bosses 69 and 70. These ears are in alignment with each other and are positioned on each side of the openings in the castings, two at the top and two at the bottom. Rotatably mounted between the ears 69 and 70 in vertical manner are the threaded rods 71, 72, 73 and 74.

As shown in detail in Fig. 9, there is mounted between the threaded rods 71 and 72 and 73 and 74 hollow axles 75 and 76. These axles are provided at each end with means for threadedly engaging the rods 71, 72, 73 and 74 and comprise four members 77, 78, 79 and 80. The members 77 and 79 at one end of the axles have threaded apertures therein which engage the threads of the rods 71 and 73 while the other ends of the axles are provided with arcuate threaded members 78 and 80 which are secured to the plungers 81 and 82 slidably mounted inside of the hollow axles 75 and 76. Bearing against the inner side of the plungers 81 and 82 are the coil springs 83 and 84 which hold the threaded arcuate members 78 and 80 in engagement with the threaded rods 72 and 74. When the cable lifter assembly is to be swung out of the way to permit the machine to be placed over the cable and strand, pressure is exerted on the knobs 85 and 86 against the tension of the springs to disengage the threaded arcuate members 78 and 80 from the rods 72 and 74, thereby permitting the assembly to be swung around as shown in Fig. 2.

Rotatably mounted on the hollow axles 75 and 76 are the rollers 87 and 88 which are mounted between and confined by means of washers 89, 90, 91 and 92. When it is desired to raise or lower the cable lifter assembly and the rollers 87 and 88 to accommodate various size of cable, the cable lifter is swung open, as shown in Fig. 2, the knurled nuts 93, and 95 mounted on the threaded rods 71 and 73 and locked in position by means of the jam nuts 97 and 99, are rotated thereby causing the cable lifter to travel upwards or downwards depending upon the direction in which the knurled nuts are turned.

As shown in Fig. 9, which illustrates the cable lifter assembly at the front end of the machine, there is provided a hinged member 101 which is pivoted between the nut 102 and the knurled nut 93. The opposite end of the member 101 is provided with an arcuate opening 103 which is adapted to be locked in position by securing it between the knurled nut 94 and the small knurled nut 104. The purpose of the member 101 is to latch the machine in the strand and act as a pusher for the temporary cable supports (not shown).

As shown in Figs. 4 and 7, there is located adjacent the handle 105 on the drum 12, a locking bolt 106. This bolt is slidably mounted in the tube 107 and is arranged to engage an opening 108 in the casting 18. A spring 109 secured to the inner end of the bolt 106 maintains the bolt in its retracted position and out of engagement with the opening 108, thus when it is desired to engage the bolt 106 with the opening 108, the bolt must be pushed forward by means of the protuberance 110 against the tension of the spring 109 until the protuberance, which is slidably mounted in the bayonet slot 111, engages the notched portion of this slot and is locked in position. The purpose of this bolt is to lock the rotatable drum 12 in its normal or upright position while it is being applied or removed from the cable and strand.

In order to properly balance the drum 12 and to compensate for the weight of the coil of wire 51, a counterweight 112 is secured diametrically opposite the coil of wire on the interior of the drum 12 as shown in Fig. 7.

To install aerial cable using applicant's cable lashing machine and where the messenger or supporting strand is secured to spaced poles, cable rings which form a temporary support for the cable are secured to the strand in the well known manner but spaced apart as shown in the patent to Bookout et al., 2,153,072. The cable is pulled through the rings and positioned therein. The number of rings required to support the cable will be dependent upon the length of the span and the size and weight of the cable.

After the cable has been positioned in the rings the machine of this invention is hoisted up and positioned over the cable 13 and the strand 14 with the drum 12 located in its normal or upright position and the cable lifters and strand latch 86 and 87 and guide 101 swung out of the way as shown in Fig. 2.

When the drum 12 is locked in position, the slotted portion thereof will be in alignment with the slotted portions in the housings 10 and 11, thereby permitting the machine to be placed over the cable 13 and strand 14 with the strand positioned in the grooves of the pulleys 42 and 43.

After the machine has been placed on the strand 14 with the strand positioned in the grooved pulleys 42 and 43, as heretofore referred to, the cable lifters 87 and 88 are swung under the cable and locked by means of arcuate members 78 and 80 which have been previously raised the desired height by turning the knurled nuts 93 and 95. The hinged latch 101 on the front of the machine is then swung under the strand 14 and locked by means of the knurled nut 104. After the machine is in place, with the bolt 106 retracted the end of the preformed coil of wire 51, which has been previously positioned in the compartment 50, is brought out through the slot 61 and given one turn around the pulley 64 and secured to the strand adjacent the pole in any suitable manner (not shown). The gate 58 is then shut and locked and the lashing of the cable to the strand may proceed.

As the machine is pulled along the strand by any suitable means, for example, by the rope 15, the drum will be caused to rotate due to the frictional engagement of the grooved pulleys 42 and 43 with the strand 14 which in turn drives gears 40 and 41 which are mounted on the ends of the pulley shafts 38 and 39. The driving gears 40 and 41 are in constant mesh with the driven gears 44 and 45 to which are secured the friction wheels 34 and 35 which in turn are in frictional engagement with the beveled ring segments 28 and 29 secured to the castings 17 and 18. In order that the drum 12 will be driven without interruption, the friction wheels 34 and 35 are located as heretofore described, on opposite sides of the machine, so that either one or the other of these wheels will be in engagement at all times with the beveled ring segments. As the machine is pulled along the strand 14, the wire 51 is lashed tightly around the cable 13 and the strand 14 as shown in Fig. 1 and the temporary supports (not shown) are removed in any suitable manner.

The machine proceeds along the strand until the next pole is reached where the lashing wire 51 is cut and secured and the machine removed and placed on the other side of the pole after swinging the cable lifter rollers 87 and 88 and the latch 101 to their open positions and locking the drum in its normal position.

While there has been shown herein and described the improved embodiment of my invention, it will be understood that various modifications and changes may be made therein without departing from the spirit of the invention.

What is claimed is:

1. A machine for securing cable to a messenger or supporting strand which comprises two stationary housings spaced apart and having a drum rotatably supported therebetween, said housings and said drum having aligned central bores for the reception of an aerial cable and its supporting strand, said machine arranged to be positioned about and advanced along a cable and strand, a preformed coil of lashing wire carried by said drum, shafts journaled in said stationary housings having pulleys mounted thereon which frictionally engage the strand, means mounted on said shafts, said means in operative relation to wheels which are in engagement with said drum to cause the rotation thereof as it advances to cause the lashing wire carried by said drum to be wrapped around the strand and cable.

2. A machine for securing cable to a messenger or supporting strand which comprises two stationary housings spaced apart and having a drum rotatably supported therebetween, said housings and said drum having aligned central bores for the reception of an aerial cable and its supporting strand, said housings and said drum having portions cut away to permit the cable and strand to be positioned in said bores, said machine arranged to be placed over and advanced along a cable and strand previously positioned in said bores, a preformed coil of lashing wire carried by said drum, pulleys journaled in said housings frictionally engaging said strand, said pulleys having connected thereto gears which mesh with gears operatively connected to beveled wheels which in turn are in frictional engagement with beveled ring segments secured on each end of said drum to cause the rotation thereof as the machine advances along the cable and strand to cause the lashing wire carried by said drum to be wrapped around the cable and strand.

3. A machine for securing cable to a messenger or supporting strand which comprises two stationary housings spaced apart and having a drum rotatably supported therebetween, said housings and said drum having aligned central bores for the reception of an aerial cable and its supporting strand, said housings and said drum having portions cut away to permit the cable and strand to be positioned in said bores, said machine arranged to be placed over and advanced along a cable and strand previously positioned in said bores, a preformed coil of lashing wire carried by said drum, pulleys journaled in said housings frictionally engaging said strand, said pulleys having connected thereto gears which mesh with gears operatively connected to beveled wheels which in turn are in frictional engagement with beveled ring segments secured on each end of said drum, and positioned on opposite sides of said machine to cause the rotation thereof as the machine advances along the cable and strand to cause the lashing wire carried by said drum to be wrapped around the cable and strand.

4. A machine for securing cable to a messenger or supporting strand which comprises two stationary housings spaced apart and having a drum rotatably supported therebetween, said housings and said drum having aligned central bores for the reception of an aerial cable and its supporting strand, said housings and said drum having portions cut away to permit the cable and strand to be positioned in said bores, said machine arranged to be placed over and advanced along a cable and strand previously positioned in said bores, a preformed coil of lashing wire carried by said drum, pulleys journaled in said housings frictionally engaging said strand, said pulleys having connected thereto gears which mesh with gears operatively connected to beveled gears which in turn are in frictional engagement with beveled ring segments secured on each end of said drum to cause the rotation thereof as the machine advances along the cable and strand to cause the lashing wire carried by said drum to be wrapped around the cable and strand, and means on the interior of said drum for locking said drum so that the opening in the bottom thereof is in alignment with the openings in the stationary housings.

5. A machine for securing cable to a messenger or supporting strand which comprises two stationary housings spaced apart and having a drum rotatably supported therebetween, said housings and said drum having aligned central bores for the reception of an aerial cable and its supporting strand, said housings and said drum having portions cut away to permit the cable and strand to be positioned in said bores, said machine arranged to be placed over and advanced along a cable and strand previously positioned in said bore, a preformed coil of lashing wire carried by said drum, pulleys journaled in said housings frictionally engaging said strand, said pulleys having connected thereto gears which mesh with gears operatively connected to beveled wheels which in turn are in frictional engagement with beveled ring segments secured on each end of said drum to cause the rotation thereof as the machine advances along the cable and strand to cause the lashing wire carried by said drum to be wrapped around the cable and strand, and means on each end of said stationary housings for positioning said cable with respect to the supporting strand.

EVERETT ST. JOHN.